Sept. 30, 1958   C. K. CLARK ET AL   2,854,420
TREATING TALL OIL SOAP AND PRODUCT OBTAINED THEREBY
Filed Dec. 22, 1955   2 Sheets-Sheet 1
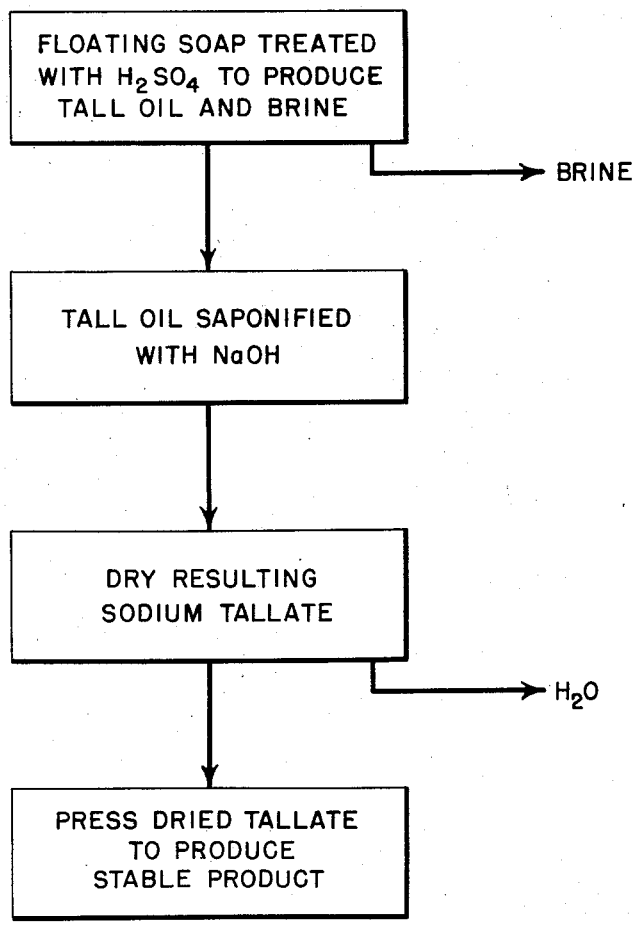
INVENTORS
CHARLES K. CLARK
and ROBERT O. NASON
BY
*Burns, Doane, Benedict & Irons*
ATTORNEYS

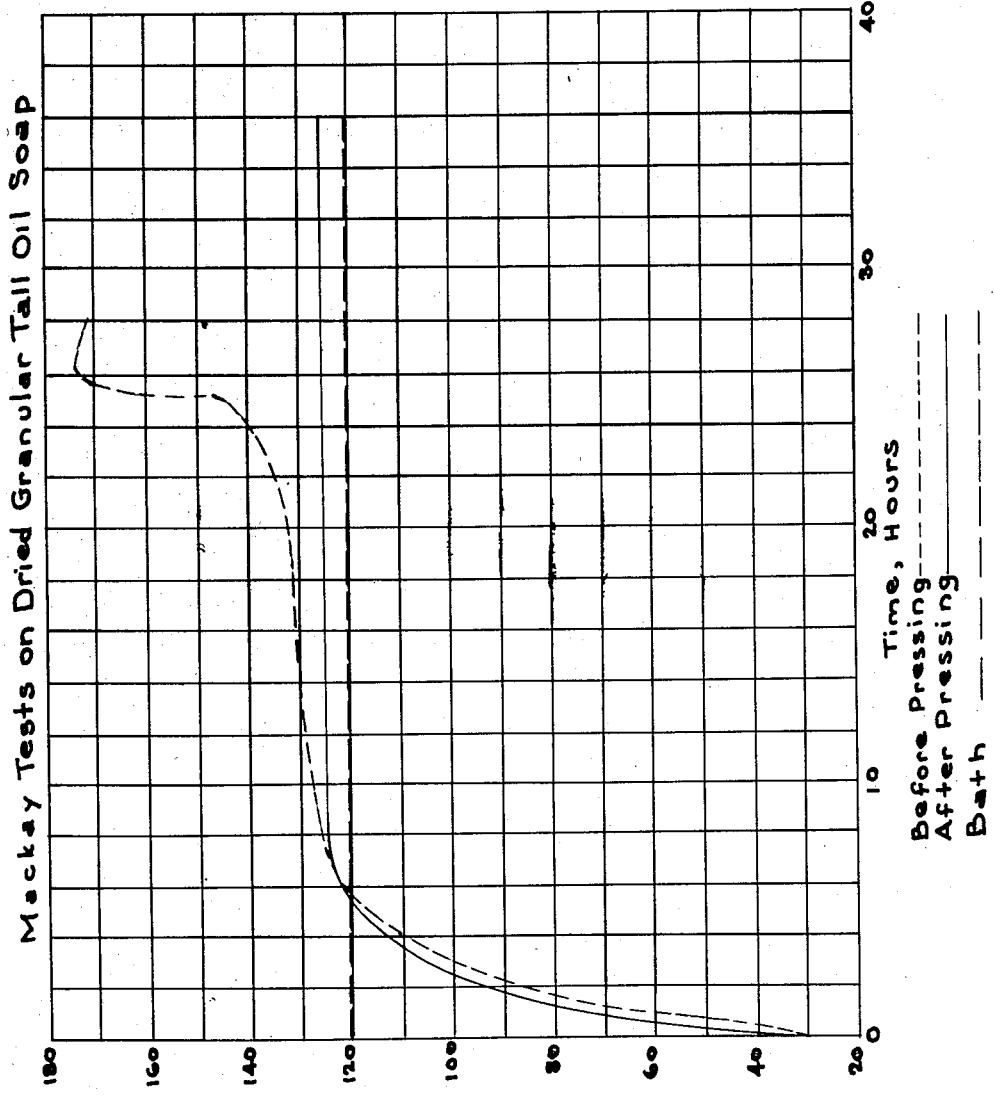

United States Patent Office 2,854,420
Patented Sept. 30, 1958

2,854,420

TREATING TALL OIL SOAP AND PRODUCT OBTAINED THEREBY

Charles K. Clark and Robert O. Nason, Crossett, Ark., assignors to Crossett Chemical Company, a Division of The Crossett Company, Crossett, Ark., a corporation of Arkansas Application December 22, 1955, Serial No. 554,681

14 Claims. (Cl. 252—368)

This invention relates to the manufacture of an improved tall oil soap, and more specifically it relates to the manufacture of sodium tallate having substantially improved properties.

Tall oil is obtained by treating the black liquor resulting from the digestion of pulpwood by the kraft or soda cooking processes and combination or modifications of these processes. The black liquor from these processes contains, among other things, the sodium salts of rosin acids and of fatty acids which separate out or float on top of the black liquor when it is evaporated to recover the alkali values therefrom, thus the name floating soap.

Conventionally, floating soap is split with sulfuric acid to form tall oil and brine. The tall oil is separated out and saponified with aqueous sodium hydroxide. Alternatively, purification by well-known means may be introduced at one or more stages of the process of obtaining sodium tallate from floating soap. For example the floating soap may be purified before acidulation or the tall oil may be purified before saponification. The resulting sodium tallate has a number of industrial uses, e. g. in soap, lubricants, etc. Although alkali metal hydroxides and other compounds may be used for the saponification, we have found no other tallate except sodium tallate which is applicable to our invention and for this reason it is intended that our use herein of the expression "tall oil soap" be so construed. This expression and "sodium tallate" are intended to include substantially dry material as well as material before being dried, and these expressions include the sodium tallate obtained by the above described process both with and without the purification steps.

For a wide variety of industrial uses of sodium tallate, it is conventional practice to dry it. Various drying methods are known including spray drying, drum drying, pan drying, and combinations of these. While all of these drying methods are applicable to the present invention, drum drying is preferred. An important use of dried sodium tallate is as an ingredient in oil well drilling fluids pursuant to U. S. Patent 2,468,657.

Notwithstanding the fact that dried sodium tallate has many important industrial uses, it has some undesirable characteristics such as a substantial tendency to heat spontaneously and to cake in storage, and to dust in handling, as well as an undesirably low bulk density and low rate of dissolution in water. Its tendency to heat spontaneously during shipment and storage is a drawback for obvious reasons. Caking during storage causes difficulties in use, especially in applications requiring the dried soap to be dissolved in water. Low bulk density results in excessive storage space requirements and high cost for shipping containers. The slow rate of dissolution in water is a disadvantage when the dried sodium tallate is used in water solution. In heating spontaneously, the sodium tallate rises in temperature (usually gradually) to a value substantially above ambient temperature which causes its particles to fuse into a charred and useless mass. All of these drawbacks are serious and the art would very much like to eliminate them.

An object of this invention is an improved tall oil soap and means of manufacturing same. A further object is the manufacture of a stabilized and otherwise improved tall oil soap. A still further object is the manufacture of tall oil soap in which the undesirable characteristics of the prior art are overcome or at least minimized. The above and other objects will be apparent from the description of this invention given hereinafter.

We have found that the above and other objects are accomplished according to this invention by carrying out the process which broadly comprises drying tall oil soap and then pressing the dried tall oil soap. More specifically, it is preferred that the tall oil soap be drum dried, pressed while warm into sheets by passing between rolls, and then flaked for most uses.

The accompanying drawing is related to Example 3 hereinafter and will be explained in connection therewith.

The following examples, wherein parts and percent are by weight unless otherwise indicated, illustrate preferred embodiments of the instant invention.

EXAMPLE 1

A solution comprising 400 parts sodium hydroxide and 1900 parts water was prepared and heated to boiling. While the mixture was being well-agitated, 3200 parts of crude tall oil was slowly added, after which the soap was maintained at 100° C. for one hour while continuing to agitate. This produced a soft brown soap with an average solids content of about 65%. It had a pH of 10.5 when dissolved in water, and hence it did not contain excess alkali or tall oil. The wet sodium tallate was fed between two revolving drums whose surfaces were maintained at a temperature of about 135° C.– 150° C. The sodium tallate was thus dried to a moisture content not exceeding about 5% (usually being 1%– 5%) and then doctored off the drum in the form of very thin, hot, sticky, fluffy and discontinuous films. The films were cooled and broken up into a coarse granular powder in suitable form for bagging and commercial use. This product had a bulk density of approximately 15 pounds per cubic foot.

EXAMPLE 2

Portions of the dried tall oil soap ready for bagging from Example 1 were obtained and further processed as follows.

This tall oil soap was pressed into sheets of about $\frac{1}{16}''$ thickness by passing same between two opposing 8" diameter steel pressure rolls, the surfaces of which were maintained at a temperature of approximately 40° C. Then the sheets were broken up into relatively small flakes, all of which passed a screen having $\frac{3}{8}''$ openings. This gave a compressed tall oil soap having a bulk density of 32 pounds per cubic foot and an absolute density of 59 pounds per cubic foot (0.95 g./cc.).

One roll was rotated by conventional driving means at a speed of about 4 R. P. M. The opposing roll idled and was rotated merely by the friction imparted by the driven roll through the tall oil soap being pressed, the idling roll rotating at a speed slightly less than that of the driven roll.

In order to obtain a direct comparison of their properties, the product of Example 1 and the product of Example 2 above were subjected to a number of identical tests. The conditions and results of these tests are described below. Hereinafter these products will sometimes be referred to as unpressed tall oil soap and pressed tall oil soap, respectively.

EXAMPLE 3

Spontaneous heating

The Mackay test, with modifications indicated below, was employed to determine the tendency of various samples of dried tall oil soap to heat spontaneously. This is a standard accelerated test originally developed for determining the spontaneous heating tendency of oils. See Scott, "Standard Methods of Chemical Analysis," 5th edition, page 1782, D. Van Nostrand Co., Inc.

In order to adapt the Mackay test to better meet the testing requirements of this invention, the test sample was placed in a wire gauze basket made of stainless steel and the basket was suspended in an air jacket immersed in a constant temperature oil bath. One end of a thermocouple was inserted into the center of the sample and the other was connected to a temperature recorder. Bath temperatures of 120° C. were used and the test periods were 36 hours.

In the Mackay test the sample temperature gradually rises to bath temperature over a period of about 6 hours. Thereafter, if the sample is reactive (i. e. unstable toward spontaneous heating) its temperature will continue to rise gradually a few degrees above bath temperature and then its temperature will suddenly begin to rise rapidly, indicating that a vigorous exothermic reaction is taking place. If the sample is non-reactive (i. e. stable toward spontaneous heating) its temperature will remain at or only slightly above bath temperature.

The Mackay test is an accelerated test, designed to determine in a few hours what may be expected to occur during several days or weeks under practical storage conditions. In the Mackay test the sample is subjected to much more severe conditions than would be encountered in storage. Accordingly, whereas a mass of dried tall oil soap in storage may gradually rise to a temperature sufficiently high to damage the soap, a sample of the same material in the Mackay test will exhibit a sudden sharp rise in temperature after a few hours' exposure. In both cases the soap particles are fused into a charred, useless mass.

Table 1 below gives the data and test conditions resulting from applying the Mackay test to unpressed and pressed tall oil soap. Among other data, Table 1 shows the reaction temperature or temperature at which the sample began to react (column 3), the time which had elapsed under the test conditions when the reaction started (column 6), the maximum temperature the sample reached (column 4), the time which had elapsed when the sample reached its maximum temperature (column 7), and crossover or the time which had elapsed when the sample reached the bath temperature (column 5). In the unpressed sample which exhibited the sudden temperature rise characteristic of the unstable material, the particles of the tall oil soap fused into a single lump, whereas the pressed sample did not react in this way but remained free flowing after the test was completed.

TABLE 1.—UNPRESSED AND PRESSED TALL OIL SOAP SPONTANEOUS HEATING

| Col. 1 | 2 | 3 | 4 | 5 | 6 | 7 |
|---|---|---|---|---|---|---|
| | Temp., ° C. | | | hours to— | | |
| Sample | Bath | Reaction | Maximum | Crossover | Reaction | Maximum |
| unpressed | 120 | 150 | 173 | 5.6 | 25.1 | 25.6 |
| pressed | 120 | none | 126 | 5.2 | none | 36.0 |

The original data for Example 3 were obtained on a conventional circular recorder chart as continuous lines which were drawn by the automatic recorder connected to thermocouples in the samples under test, as mentioned in the first part of Example 3 above. The data in Table 1 above were obtained by reading off values at appropriate points on the original recorder charts. The drawing accompanying this application is a graphical representation of the curves drawn by the automatic recorder when testing the samples. These are shown as the dotted line curve, the dash line curve and the solid line curve, respectively, in the drawing.

EXAMPLE 4

Rate of solution in water

In comparing the rate of solution in water of the unpressed tall oil soap with that of the pressed tall oil soap, 10% aqueous solutions were prepared of each using a temperature of 25° C. and identical containers, amounts of materials and agitation in each case. The unpressed tall oil soap required 180 minutes to dissolve completely, whereas the pressed tall oil soap was completely dissolved in only 35 minutes.

EXAMPLE 5

Dustiness

Extensive handling of the unpressed tall oil soap raised a substantial amount of dust which irritated the eyes and nose, whereas pratically no dust was raised nor irritation to the eyes and nose noted from similar handling of the pressed tall oil soap.

EXAMPLE 6

Caking tendency

Employing identical conditions, accelerated tests were made on unpressed tall oil soap and pressed tall oil soap. In each test a container holding a sample of tall oil soap with a weight on top of the sample was maintained in a heated oven for a given time. The detailed conditions are given in Table 2 below.

TABLE 2.—CAKING TENDENCY

Temperature _____ 40° C.
Time _____ 4 days.
Weight _____ 8.2 lbs.
Bearing area _____ 4 sq. in.
Pressure on sample _____ 2.1 lbs./sq. in.

At the conclusion of the tests, the unpressed tall oil soap was caked severely and failed to flow from the container upon attempting to pour it, whereas substantially no caking was detected in the pressed tall oil soap and it flowed freely when poured from the container.

EXAMPLE 7

Density

The bulk density of the unpressed tall oil soap was found to be only about 15 pounds per cubic foot as compared with 32 pounds per cubic foot bulk density and about 59 pounds per cubic foot (0.95 g./cc.) absolute density for the pressed tall oil soap.

EXAMPLE 8

Pressure

Since it is not feasible to directly determine or estimate the pressure to which the tall oil soap is subjected as it passes between a set of pressure rolls, other means were used to measure the effect of pressure as accurately as possible.

Accordingly, portions of the dried tall oil soap ready for bagging from Example 1 were obtained and subjected to the following test conditions. Two series of samples were prepared over a range of pressures, employing a different temperature for each series and the same amount of tall oil soap for each sample. Samples of uniform size were prepared by placing the tall oil soap in a die of one square inch cross sectional area and applying the desired pressure in a hydraulic press. Hereinafter this will be referred to as a platen press as distinguished from a roll press. The conditions of preparing these samples and the results obtained are summarized in Table 3 below.

TABLE 3.—PRESSURE

| Sample No. | Temp., °C. | Pressure, lb./sq. in | Density, g./cc. |
|---|---|---|---|
| 1 | 25 | 2,000 | 0.97 |
| 2 | 25 | 3,000 | 1.04 |
| 3 | 25 | 4,000 | 1.05 |
| 4 | 25 | 5,000 | 1.06 |
| 5 | 25 | 17,000 | 1.06 |
| 6 | 65 | 750 | 1.03 |
| 7 | 65 | 1,000 | 1.05 |
| 8 | 65 | 1,250 | 1.06 |
| 9 | 65 | 2,000 | 1.06 |

By analyzing Table 3 above and by comparing the densities and general characteristics, such as color, texture, outward appearance, etc., of these samples made in the platen press with the tall oil soap made by roll pressing under satisfactory conditions, the following were evident. (1) With each of the two temperatures employed the density of the samples made in the platen press increased with pressure to a maximum value beyond which additional pressure caused no increase in density, and for all practical purposes, the quality of the product followed the same pattern. (2) This improvement in product was gradual. The gradual improvement in product with increased pressure was accompanied by a gradual darkening in color from the light tan of the starting material to the dark brown of the product pressed to the maximum density shown. As the pressure was increased to give products having the density range shown, the outward appearance thereof varied from a rough granular surface to a vitreous surface. No substantial difference in effect of pressure nor in the above criteria by which the effect of pressure became apparent were found between roll pressing and pressing in a platen press.

EXAMPLE 9

*Application of pressure by extrusion*

A portion of the dried tall oil soap ready for bagging from Example 1 was obtained and placed in a 1⅛" diameter steel die, fitted with a plunger. The temperature of the tall oil soap when charged to the die was 27° C. In one end of the die there was a 1/16" diameter orifice. A hydraulic press was used to subject the plunger to a pressure of 9000 p. s. i. which forced the plunger into the die. This caused the soap particles to coalesce and to flow out through the orifice in the form of a homogeneous and continuous string. The string was broken up into small cylindrical pieces, giving a material having an absolute density of 1.08 g./cc. and a bulk density of 34 lb./cu. ft. This product had satisfactory properties and was substantially improved as compared with conventional tall oil soap. Its properties were similar to the properties of the tall oil soap made by roll pressing and by platen pressing.

The above examples are given as illustrations of this invention and are not intended as limitations thereof except as recited in the claims attached hereto. The present invention broadly relates to an improved tall oil soap and process of manufacturing same which comprises drying the tall oil soap from black liquor and then pressing the dried soap.

The conditions of practicing this invention may be varied widely without departing from the spirit and scope thereof. The invention has been carried out wherein temperatures of 40° C.–110° C. of the surface of the pressure rolls were employed. While temperatures below and above this range are operable, it is less desirable to employ them. At lower temperatures difficulty is apt to be encountered in getting the particles to adhere together into a uniformly densified sheet, whereas the use of higher temperatures approaches the temperature at which the tall oil soap is apt to be damaged by oxidation or other means.

Temperatures falling in the lower portion of this range gave good results and are preferred. A chief reason for this preference is that they are advantageous from the process engineering standpoint, i. e. the surface of the rolls will reach and maintain these lower temperatures in actual operation because of the temperature of the dried tall oil soap as it comes from the drum drying operation to be pressed and also because of the heat of friction produced in pressing. Therefore, no application of heat is necessary since the heat naturally emanating during the pressing step is sufficient.

As pointed out in Example 8 above, pressure varies inversely with temperature. While pressures of 750–17,000 p. s. i. have been successfully employed (Example 8), preferably the pressure will be only as high as necessary to give substantially the maximum density of product under the other conditions involved. Near the preferred temperature of 40° C., i. e. at 45° C., this pressure was found to be about 1750 p. s. i. While pressures outside the ranges disclosed herein are operable within the scope of this invention, they are less desirable. Substantially the same considerations apply whether the pressure is supplied by rolls, platens or extrusion.

Of course, the extrusion set forth in Example 9 could be made continuous by substituting a screw feeder for the plunger. Likewise, a plurality of orifices could be employed and also the strings of soap could be subdivided into pieces of any desired size and shape by rotating vanes or other means.

Rotational speed of the pressure rolls is not critical. Good results have been obtained using 8" diameter rolls at speeds of 4–25 R. P. M. However, as compared with rotating the two opposing pressure rolls at the same speed, we have obtained better results by maintaining a difference in their rotational speeds. This may be accomplished, e. g. by employing a differential drive or by driving only one roll and allowing the other to idle and to rotate only by means of the friction imparted by the driven roll through the tall oil soap being pressed.

Likewise, the thickness of the pressed sheets may be varied widely as desired. Obviously the pressed sheets may be flaked into pieces of any desired size and shape as long as substantial powdering or pulverization of the tall oil soap does not result. As pointed out hereinbefore, the chief purpose in flaking is to obtain greater convenience in storing, handling and using.

It is clear from the foregoing that this invention constitutes a marked improvement over the prior art. Although the process of this invention is relatively simple, it gives a useful product which is far superior to that of the art. As compared to the product of the art, the improved product of the instant invention has the highly desirable properties of being much less prone to heat spontaneously and of being virtually free of the tendency to fuse and char if for any reason it is subjected to elevated temperatures, which properties represent substantial improvents from the standpoint of safety and economy. Likewise, the improved product has much less tendency toward dusting and caking, which obviously are very important improvements from the standpoint of health hazard, waste and ease of application. The improved product of this invention also dissolves in water much more readily than that of the art, thereby rendering it substantially more desirable for uses requiring it in aqueous solution.

Quite contrary to our expectations, of the several tallates we have tried, we have found no other tallate except sodium tallate which is applicable to the present invention. The tallates evaluated include even the other alkali metal tallates, e. g. potassium tallate.

As many apparently widely different embodiments of this invention may be made without departing from the spirit and scope thereof, it is to be understood that the invention is not limited to the specific embodiments thereof except as defined in the appended claims.

This application is a continuation-in-part of our copending application Serial Number 483,369, filed January 21, 1955.

What is claimed is:

1. The process which comprises at least partially drying a sodium tall oil soap obtained as a by-product of pulpwood digestion processes and containing a substantial portion of the impurities naturally present therein, compressing said partially dried soap to an absolute density of at least about 0.95 gram per cubic centimeter and comminuting said compressed soap to produce a substantially non-caking, substantially non-dusting, particulate soap product which is resistant to spontaneous heating.

2. The process of claim 1 wherein said sodium tall oil soap is compressed while hot.

3. The process of claim 2 wherein said sodium tall oil soap is compressed while at an elevated temperature from the drying step.

4. The process of claim 2 wherein said sodium tall oil soap is compressed by passage between pressure rolls.

5. The process of claim 4 wherein said sodium tall oil soap is compressed by passage between said pressure rolls while at an elevated temperature from the drying step.

6. The process of claim 4 wherein said sodium tall oil soap is compressed by passage between heated pressure rolls.

7. The process of claim 6 wherein said pressure rolls are characterized by a surface temperature of about 40° C. to about 110° C.

8. The process of claim 2 wherein said pressure rolls are rotated at different speeds.

9. The process of claim 2 wherein said sodium tall oil soap is dried to a moisture content not exceeding about 5% prior to compression by passage between said pressure rolls.

10. The process of claim 1 wherein said sodium tall oil soap is compressed by extrusion through an orifice under superatmospheric pressure.

11. The process of claim 10 wherein said extrusion is effected while said sodium tall oil soap is still at an elevated temperature from the drying step.

12. The process of claim 1 wherein said sodium tall oil soap is compressed in a platen press.

13. The process of claim 12 wherein compression is effected while said sodium tall oil soap is still hot from the drying step.

14. A particulate sodium tall oil soap obtained as a by-product of pulpwood digestion processes and having an absolute density of at least about 0.95 gram per cubic centimeter, said soap being substantially anticaking, substantially non-dusting, resistant to spontaneous heating, and characterized by an improved rate of water solubility as compared with a tall oil soap having a substantially lower absolute density, said particulate soap containing a substantial portion of the impurities naturally present therein.

References Cited in the file of this patent

UNITED STATES PATENTS

| | | |
|---|---|---|
| 2,245,536 | Thurman | June 10, 1941 |
| 2,306,352 | Burrell | Dec. 22, 1942 |
| 2,359,404 | Colgate | Oct. 31, 1944 |
| 2,364,965 | Georgi | Dec. 12, 1944 |
| 2,390,990 | Clayton | Dec. 18, 1945 |